(12) United States Patent
Tung et al.

(10) Patent No.: US 9,004,447 B2
(45) Date of Patent: Apr. 14, 2015

(54) PRESSURE RELIEF VALVE

(71) Applicant: Xiamen Koge Micro Tech Co., Ltd., Xiamen, Fujian (CN)

(72) Inventors: Cheng-Kai Tung, New Taipei (TW); Sheng-Min Yang, New Taipei (TW)

(73) Assignee: Xiamen Koge Micro Tech Co., Ltd., Xiamen (CN)

( * ) Notice: Subject to any disclaimer, the term of this patent is extended or adjusted under 35 U.S.C. 154(b) by 219 days.

(21) Appl. No.: 13/687,571

(22) Filed: Nov. 28, 2012

(65) Prior Publication Data

US 2013/0319546 A1 Dec. 5, 2013

(30) Foreign Application Priority Data

Jun. 4, 2012 (TW) .............................. 101210728 U

(51) Int. Cl.
*F16K 31/06* (2006.01)
*F16K 27/02* (2006.01)

(52) U.S. Cl.
CPC ............. *F16K 31/06* (2013.01); *F16K 31/0651* (2013.01); *F16K 31/0655* (2013.01); *F16K 27/029* (2013.01); *F16K 31/0648* (2013.01)

(58) Field of Classification Search
CPC . F16K 31/06; F16K 31/0648; F16K 31/0651; F16K 31/0655
USPC ................ 137/870, 871; 251/129.02, 129.15, 251/129.21; 303/119.2
See application file for complete search history.

(56) References Cited

U.S. PATENT DOCUMENTS

| | | | | |
|---|---|---|---|---|
| 4,838,519 A * | 6/1989 | Buffet et al. | ............. | 251/129.21 |
| 5,364,067 A * | 11/1994 | Linkner, Jr. | ................. | 303/119.2 |
| 5,848,780 A * | 12/1998 | Miller et al. | ............. | 251/129.21 |
| 6,253,789 B1 * | 7/2001 | Krimmer et al. | ............... | 137/550 |
| 6,345,870 B1 * | 2/2002 | Linkner et al. | ............. | 303/119.2 |
| 6,450,590 B1 * | 9/2002 | Leventhal | ................... | 303/119.2 |
| 7,857,282 B2 * | 12/2010 | Goossens | ................. | 251/129.07 |
| 8,220,776 B2 * | 7/2012 | Tagata et al. | ............. | 251/129.02 |
| 2007/0023723 A1 * | 2/2007 | Magri | ....................... | 251/129.21 |
| 2008/0272208 A1 * | 11/2008 | Anderson et al. | ............. | 239/302 |
| 2008/0308760 A1 * | 12/2008 | Matsumoto et al. | ..... | 251/129.15 |
| 2009/0050829 A1 * | 2/2009 | Haynes et al. | ........... | 251/129.02 |
| 2013/0153800 A1 * | 6/2013 | Roether et al. | ........... | 251/129.21 |
| 2013/0168584 A1 * | 7/2013 | Tung et al. | ................ | 251/129.15 |

\* cited by examiner

*Primary Examiner* — Matthew W Jellett

(74) *Attorney, Agent, or Firm* — Michael A. Glenn; Perkins Coie LLP

(57) ABSTRACT

A pressure relief valve includes an outer frame, a ferromagnetic cylinder, a plastic air faucet, an electrical coil module and a spring. The plastic air faucet has a first end extending through a through hole of the outer frame and a second opposite end extending through a hollow channel of the ferromagnetic cylinder. The electrical coil module is located within the outer frame and has a central passage allowing the ferromagnetic cylinder to be accommodated inside. The ferromagnetic stopper is slidable along the central passage of the electrical coil module, wherein the ferromagnetic stopper has a seal gasket. The spring is located between the air faucet and the ferromagnetic stopper. When the electrical coil module is electrified, the ferromagnetic stopper and the ferromagnetic cylinder attract each other to against the resilient force of the spring to push the seal gasket against the air opening of the air faucet.

11 Claims, 7 Drawing Sheets

PRESSURE RELIEF VALVE

RELATED APPLICATIONS

The present application is based on, and claims priority from, Taiwan Application Serial Number 101210728, filed on Jun. 4, 2012, the disclosure of which is hereby incorporated by reference herein in its entirety.

BACKGROUND

1. Field of Invention

The present invention relates to an electromagnetic valve. More particularly, the present invention relates to an electromagnetic pressure relief valve.

2. Description of Related Art

FIG. 1 illustrates a cross-sectional view of a conventional pressure relief valve. An air faucet 120 of the pressure relief valve 100 is coupled with a pipe, which needs to release its pressure. In a release mode of the pressure relief valve 100, a resilient force of the spring 112 is to prevent the gasket 106 from contacting or sealing the air opening 114a such that the pressure relief valve 100 can release air pressure via the air opening 114a. In a sealing mode of the pressure relief valve 100, the coil wire 110 of the pressure relief valve 100 is electrified, the ferromagnetic stopper 108 and the ferromagnetic cylinder 114 attract each other to against the resilient force of the spring 112 so as to push the gasket 106 against the air opening 114a, namely, the air pressure is not released via the air opening 114a.

In this conventional pressure relief valve 100, the air faucet 120 and the ferromagnetic cylinder 114 are of a single unitary metallic piece, i.e., a ferromagnetic cylinder, namely, the air opening 114a is formed on the ferromagnetic cylinder 114. In order to enable the air opening 114a to be easily sealed by the gasket 106, the air opening 114a needs to be precisely manufactured. Because the manufacturing costs for forming the air opening on the ferromagnetic cylinder is high, the total cost of the pressure relief valve 100 is hardly lowered.

SUMMARY

It is therefore an objective of the present invention to provide an improved pressure relief valve.

In accordance with the foregoing and other objectives of the present invention, a pressure relief valve includes an outer frame, a ferromagnetic cylinder, a plastic air faucet, an electrical coil module and a spring. The outer frame has a through hole. The ferromagnetic cylinder has a hollow channel. The plastic air faucet has a first end extending through the through hole and protruding out of the outer frame and a second opposite end extending through the hollow channel, whereby an air opening of the second opposite end is exposed. The electrical coil module is located within the outer frame and has a central passage allowing the ferromagnetic cylinder to be accommodated inside. The ferromagnetic stopper is slidable along the central passage of the electrical coil module, wherein the ferromagnetic stopper has a seal gasket at an end thereof to seal the air opening of the air faucet. The spring is located between the air faucet and the ferromagnetic stopper to provide a resilient force against the ferromagnetic stopper. When the electrical coil module is electrified, the ferromagnetic stopper and the ferromagnetic cylinder attract each other to against the resilient force of the spring so as to push the seal gasket against the air opening of the air faucet.

In another embodiment disclosed herein, the spring is a compression spring.

In another embodiment disclosed herein, the outer frame is a metallic frame.

In another embodiment disclosed herein, the seal gasket is a gasket made from elastic materials.

In another embodiment disclosed herein, the seal gasket is embedded within an end portion of the ferromagnetic stopper.

In another embodiment disclosed herein, the electrical coil module includes a coil frame and a coil wire, the coil wire is wrapped around the coil frame.

In another embodiment disclosed herein, the pressure relief valve further includes a pair of electrode terminals, which are electrically connected with two opposite ends of the coil wire.

In another embodiment disclosed herein, the pressure relief valve further includes a metal plate to secure the electrical coil module to the outer frame.

In another embodiment disclosed herein, the coil frame is a plastic frame.

In another embodiment disclosed herein, the air faucet has a positioning rib to engage a positioning slot disposed at the through hole of the outer frame.

In another embodiment disclosed herein, the air faucet has an outer ring, and the outer ring has a cutout to serve as a pressure relief channel.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
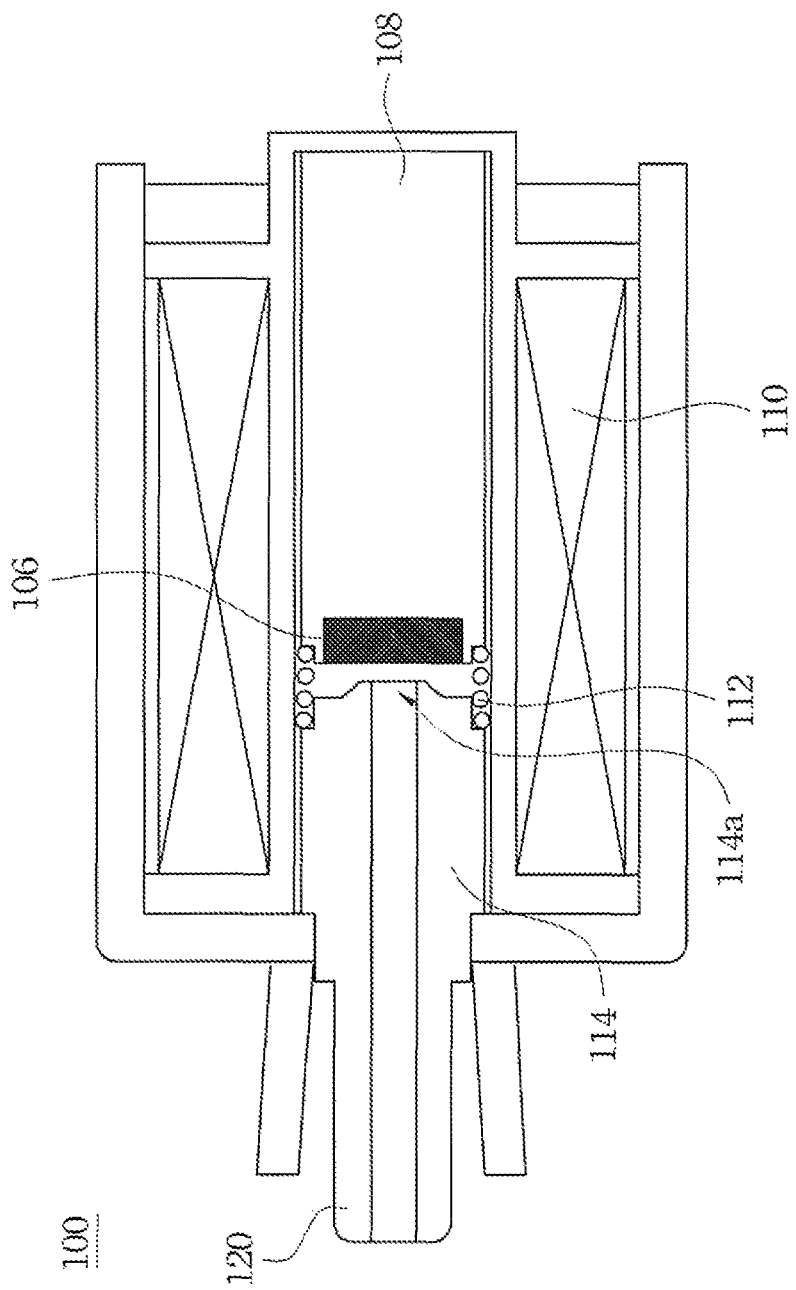
FIG. 1 illustrates a cross-sectional view of a conventional pressure relief valve.

Reference will now be made in detail to the present preferred embodiments of the invention, examples of which are illustrated in the accompanying drawings. Wherever possible, the same reference numbers are used in the drawings and the description to refer to the same or like parts.

Figure 2:
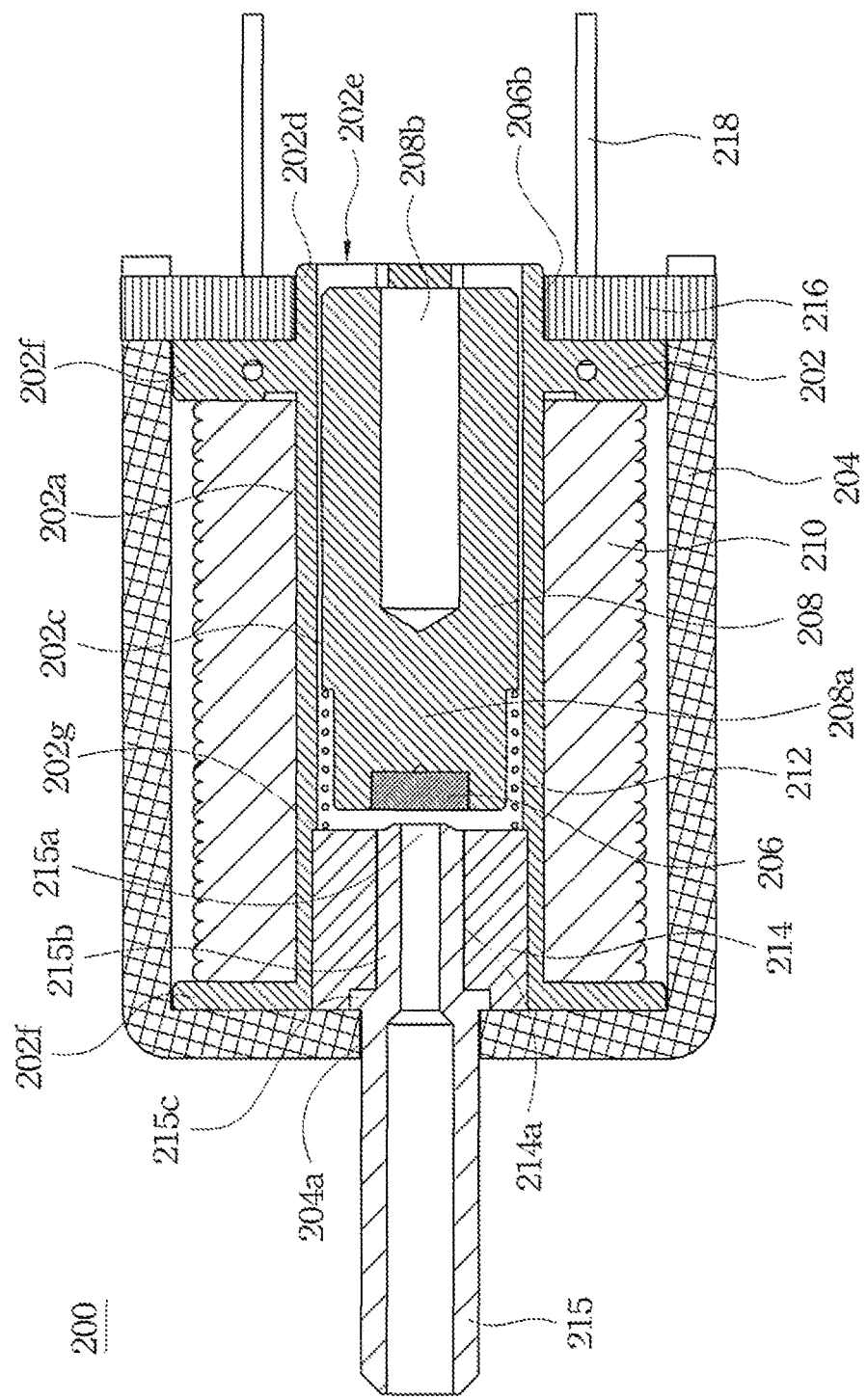
FIG. 2 illustrates a cross-sectional view of a pressure relief valve according to a first embodiment of this invention.
Figure 3:
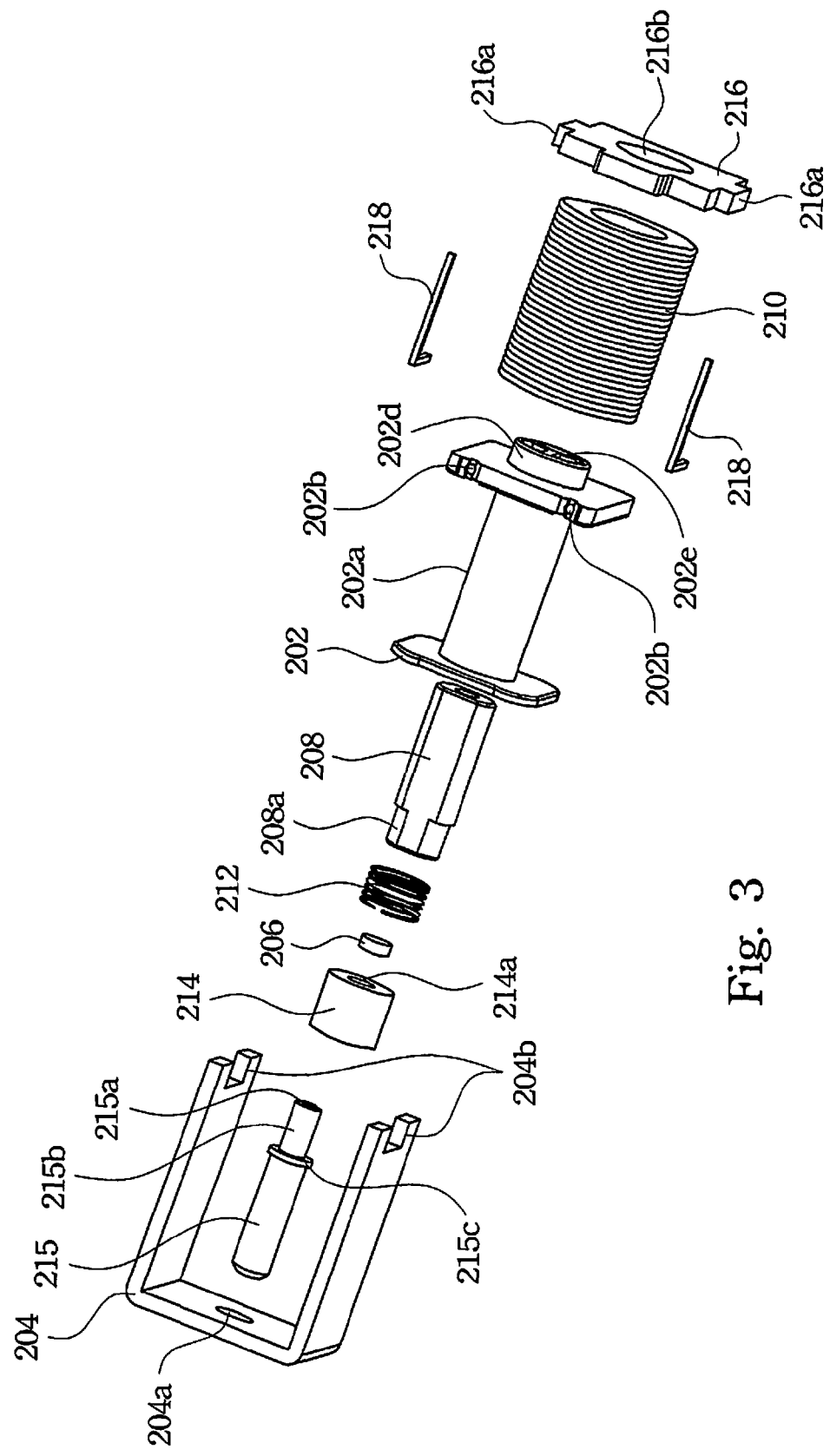
FIG. 3 illustrates an exploded view of the pressure relief valve in FIG. 2.

FIG. 2 illustrates a cross-sectional view of a pressure relief valve according to a first embodiment of this invention, and FIG. 3 illustrates an exploded view of the pressure relief valve in FIG. 2. The pressure relief valve 200 basically includes an outer frame 204, a ferromagnetic cylinder 214, a plastic air faucet 215, an electrical coil module, a ferromagnetic stopper 208 and a spring 212. The plastic air faucet 215 is used to connect with a pipe, which needs to release its pressure, and the pipe can be any pipe to allow any type of fluids flowing inside. In a release mode of the pressure relief valve 200, a resilient force of the spring 212 is to prevent the seal gasket 206 from contacting or sealing the air opening 215a such that the pressure relief valve 200 can release air pressure via the air opening 215a. In a sealing mode of the pressure relief valve 200, the coil wire 210 of the pressure relief valve 200 is electrified, the ferromagnetic stopper 208 and the ferromagnetic cylinder 214 attract each other to against the resilient force of the spring 212 so as to push the seal gasket 206 against the air opening 215a of the air faucet 215, namely, the air pressure is not released via the air opening 215a.

In this embodiment, the outer frame 204 can be a U-shaped metallic outer frame. The outer frame 204 has a through hole 204a for an end of the plastic air faucet 215 to extend through and protrude out.

The ferromagnetic cylinder 214 has a hollow channel 214a. When the plastic air faucet 215 is assembled into the outer frame 204, an end of the plastic air faucet 215 extends through the through hole 204a and protrudes out while the other end 215b of the plastic air faucet 215 extends through the hollow channel 214a, thereby exposing the air opening 215a of the air faucet 215. When the outer frame 204, the plastic air faucet 215 and the ferromagnetic cylinder 214 are assembled, an outer ring 215c of the plastic air faucet 215 is sandwiched between the ferromagnetic cylinder 214 and the opening 204a of the outer frame 204 so as to secure the plastic air faucet 215 within the pressure relief valve. In this embodiment, the plastic air faucet 215 is made by a plastic injection molding to form the air opening 215a, such that the desired dimensions and accuracy of the plastic air faucet 215 can be achieved by lower costs (compared with the air opening on the metal member as illustrated in FIG. 1).

In this embodiment, the electrical coil module includes a coil frame 202 and a coil wire 210, the coil wire 210 is wrapped around a wire trough 202a of the coil frame 202 and an insulating tape may be necessary to be an insulation between the coil wire 210 and the outer frame 204. The coil frame 202 has two restriction portions 202f at two opposite ends and the wire trough 202a is defined between the two restriction portions 202f. In addition, the coil frame 202 may be a plastic frame or a coil frame made by other insulating materials. The coil frame 202 is secured to the outer frame 204 and has a central passage 202c to accommodate the ferromagnetic cylinder 214 inside. In addition, the coil frame 202 is equipped with a circular step 202g on an inner wall of the central passage 202c. The circular step 202g is used to secure the ferromagnetic cylinder 214 within the central passage 202c after the coil frame 202 is assembled to the outer frame 204.

The ferromagnetic stopper 208 is slidable along the central passage 202c of the coil frame 202. The ferromagnetic stopper 208 has a seal gasket 206 at its end to seal the air opening 215a of the plastic air faucet 215. The ferromagnetic stopper 208 has a material-saving hole 208b at its opposite end to reduce its weight such that the required spring 212 can be of smaller size to achieve the desired effect. In this embodiment, the seal gasket 206 can be a rubber gasket or a gasket of other elastic materials. In addition, the seal gasket 206 is embedded into an end portion 208a of the ferromagnetic stopper 208, thereby reducing the size of the seal gasket 206 and manufacturing costs for fastening the seal gasket 206 to the ferromagnetic stopper 208.

The spring 212 has a first end connected around the air opening 215a and a second opposite end arranged around the end portion 208a of the ferromagnetic stopper 208. The spring 212 is used to space the seal gasket 206 apart the air opening 215a in the pressure relief valve 200. In this embodiment, the spring 212 is a compression spring.

The pressure relief valve 200 further includes a pair of electrode terminals 218, which are electrically connected with two opposite ends of the coil wire 210. Two electrode terminals 218 are fastened within two positioning slots 202b of the coil frame 202 respectively. The electrode terminals 218 are electrically connected with an outer power source to supply the coil wire 210 with electrical currents. In a conventional pressure relief valve, the coil wire is electrically connected with an outer power source directly. In this embodiment, the electrode terminals 218 are fastened to the coil frame 202 and easily to be manufactured by a machinery-automatic process to save time and costs.

A metal plate 216 is used to secure the electrical coil module to the outer frame 204 and to form a magnetic loop around the combination of the outer frame 204 and metal plate 216 to increase magnetic field. In particular, a protruding cylinder 202d of the coil frame 202 engages a central hole 216b of the metal plate 216, and each protruding member 216a of the metal plate 216 engages a corresponding concave slot 204b of the outer frame 204 so as to secure the electrical coil module to the outer frame 204.

Figure 4:
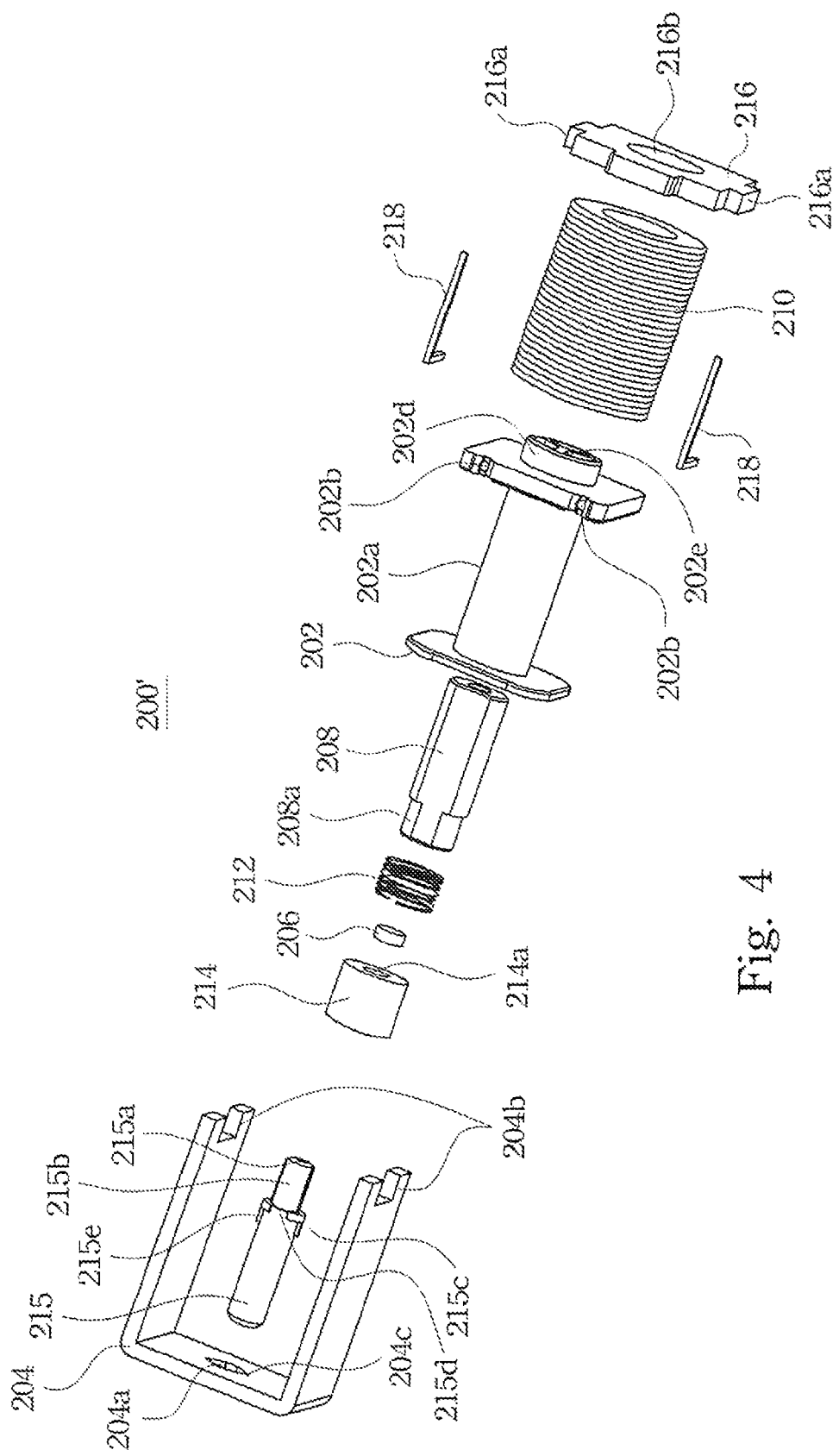
FIG. 4 illustrates an exploded view of a pressure relief valve according to a second embodiment of this invention.

FIG. 4 illustrates an exploded view of a pressure relief valve according to a second embodiment of this invention. The pressure relief valve 200' of FIG. 4 is different from the pressure relief valve 200 of FIG. 2 and FIG. 3 mainly in an assembling mechanism between the plastic air faucet 215 and the outer frame 204. In this embodiment, the plastic air faucet 215 has a pair of positioning ribs 215e extending from the outer ring 215c in an axial direction of the plastic air faucet 215. Each positioning rib 215e is used to engage a positioning slot 204c located at a rim of the through hole 204a of the outer frame 204. Therefore, when a torsion force, i.e., a rotation force, is applied to the plastic air faucet 215 to connect with a pipe, the plastic air faucet 215 will not be rotated relative to the outer frame 204. In addition, the outer ring 215c of the air faucet 215 has a cutout 215d to serve as a pressure relief channel. In this embodiment, each cutout 215d is located between two positioning ribs 215e extending from the outer ring 215c.

Figure 5:
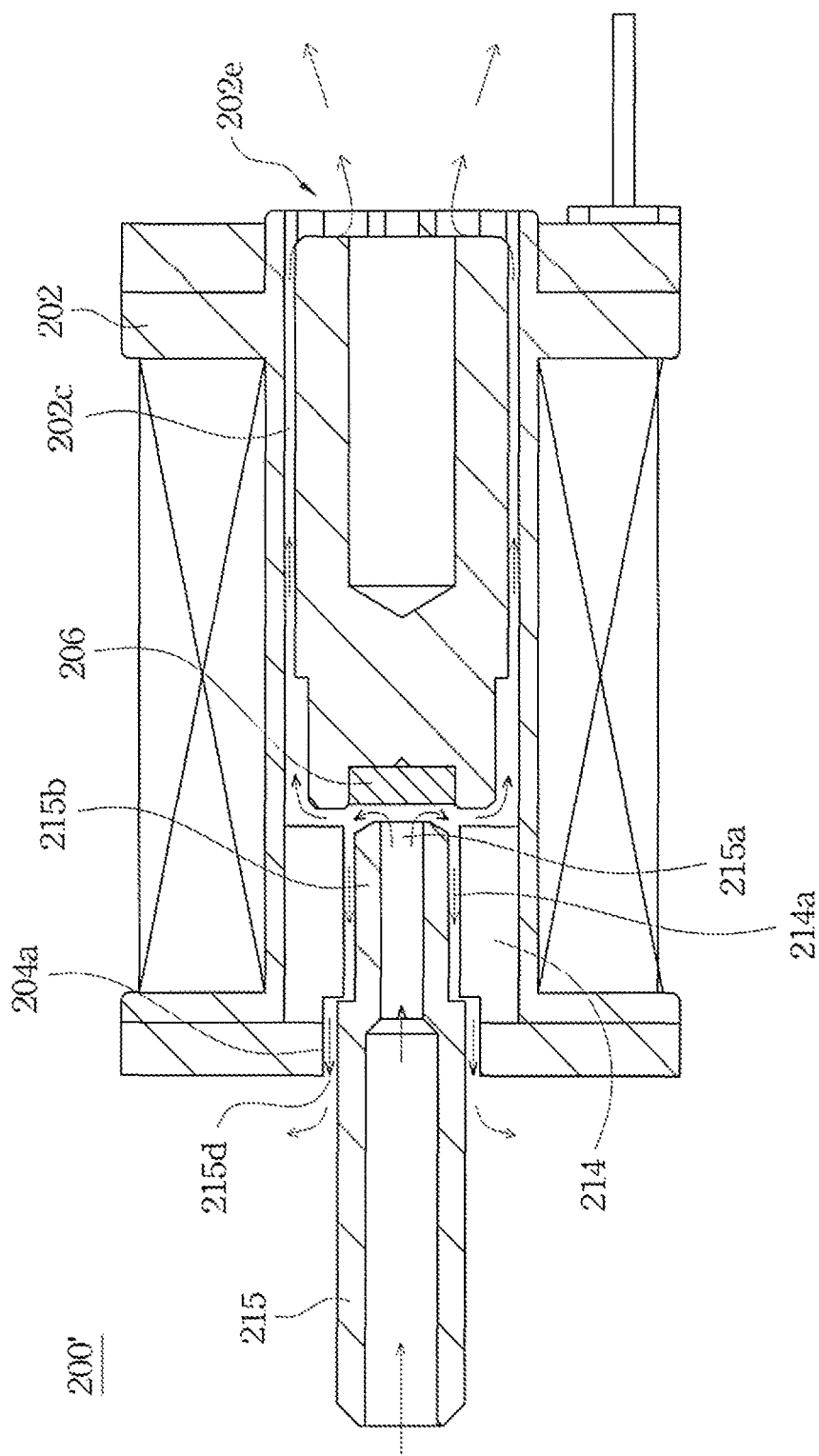
FIG. 5 illustrates a cross-sectional view of the assembled pressure relief valve in FIG. 4.

FIG. 5 illustrates a cross-sectional view of the assembled pressure relief valve in FIG. 4. Because the outer ring 215c of the air faucet 215 has a cutout 215d, the cutout 215d serves as a pressure relief channel when the plastic air faucet 215 is assembled to to the through hole 204a of the outer frame 204. In addition, an outer diameter of the end 215b of the plastic air faucet 215 should be smaller than an inner diameter of the hollow channel 214a of the ferromagnetic cylinder 214 to form a gap therebetween to serve as a pressure relief channel. Therefore, in a release mode of the pressure relief valve 200', airflows input via the plastic air faucet 215 can be released via the central passage 202c and a pressure relief opening 202e of the coil frame 202, and also released via the hollow channel 214a of the ferromagnetic cylinder 214 and the cutout 215d of the plastic air faucet 215 (as arrows illustrated in FIG. 5). That is, the pressure relief valve 200' has two pressure relief openings at two opposite ends thereof to enhance pressure relief efficiency.

Figure 6:
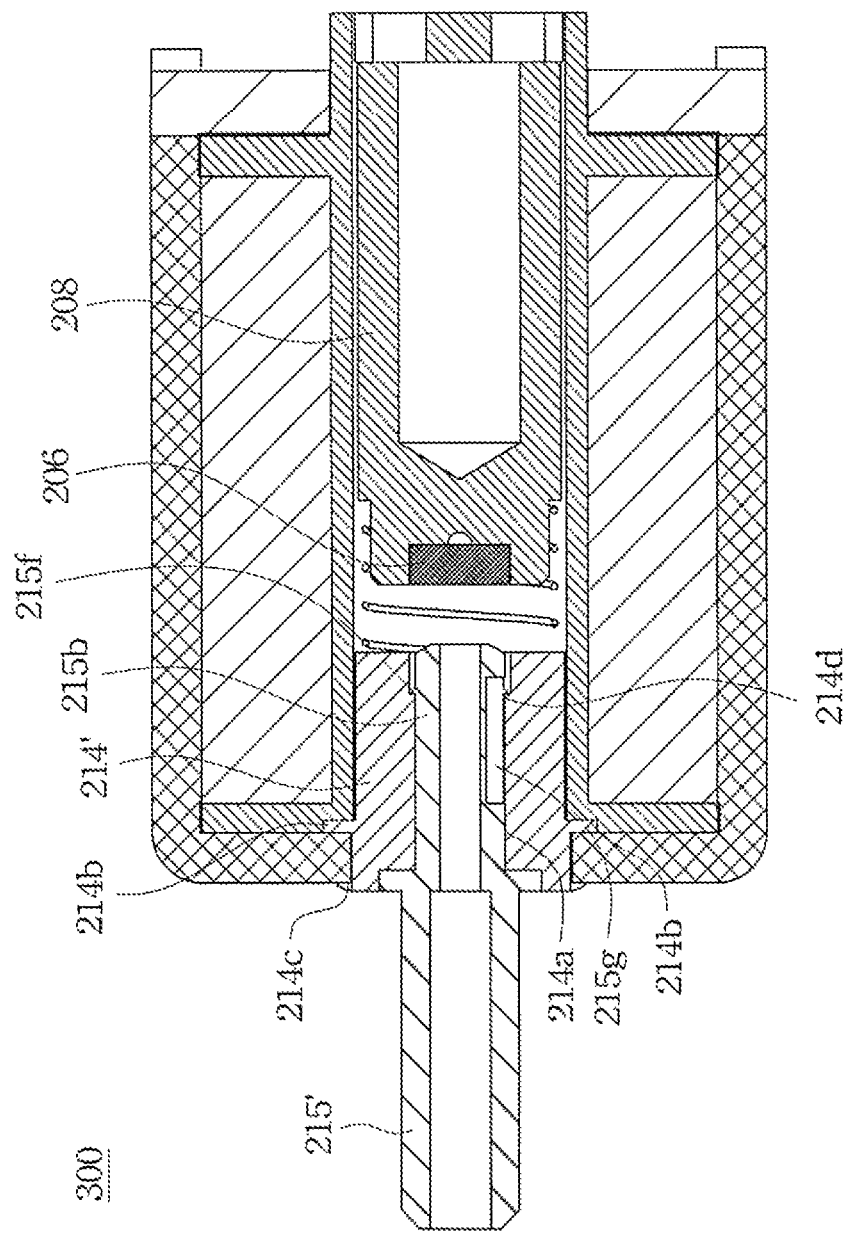
FIG. 6 illustrates a cross-sectional view of a pressure relief valve according to a third embodiment of this invention.

FIG. 6 illustrates a cross-sectional view of a pressure relief valve according to a third embodiment of this invention. The pressure relief valve 300 of FIG. 6 is different from the pressure relief valve 200 of FIG. 2 and FIG. 3 mainly in a securing mechanism between the plastic air faucet and the outer frame. In this embodiment, a plastic air faucet 215' is secured to a hollow channel 214a of a ferromagnetic cylinder

214'. The ferromagnetic cylinder 214' is equipped with a circular step 214d in an inner wall of the hollow channel 214a thereof, namely, the circular step 214d forms an inner diameter difference within the hollow channel 214a. The plastic air faucet 215' has a circular outer hook 215f at the end 215b thereof. When the end 215b of the plastic air faucet 215' extends through the hollow channel 214a of the ferromagnetic cylinder 214, the circular outer hook 215f engages the circular step 214d to secure the plastic air faucet 215' to the ferromagnetic cylinder 214'. When the end 215b of the plastic air faucet 215' passes through the hollow channel 214a of the ferromagnetic cylinder 214', at least the circular outer hook 215f of the plastic air faucet 215' should be shrunk in its diameter. Multiple stripe cutouts 215g are designed around the end 215b of the plastic air faucet 215" such that the circular outer hook 215f of the plastic air faucet 215" becomes a resilient structure and can be shrunk in its diameter to easily passes through the hollow channel 214a of the ferromagnetic cylinder 214'. In addition, the ferromagnetic cylinder 214' has a first outer position ring 214b and a second outer position ring 214c. The first and second outer position rings (214b, 214c) are used to sandwich a portion of the outer frame 204 surrounding the through hole 204a so as to secure the ferromagnetic cylinder 214' to the outer frame 204. The second outer position ring 214c is formed by pressing an edge of the ferromagnetic cylinder 214' after the ferromagnetic cylinder 214' passes through the through hole 204a of the outer frame 204.

Figure 7:
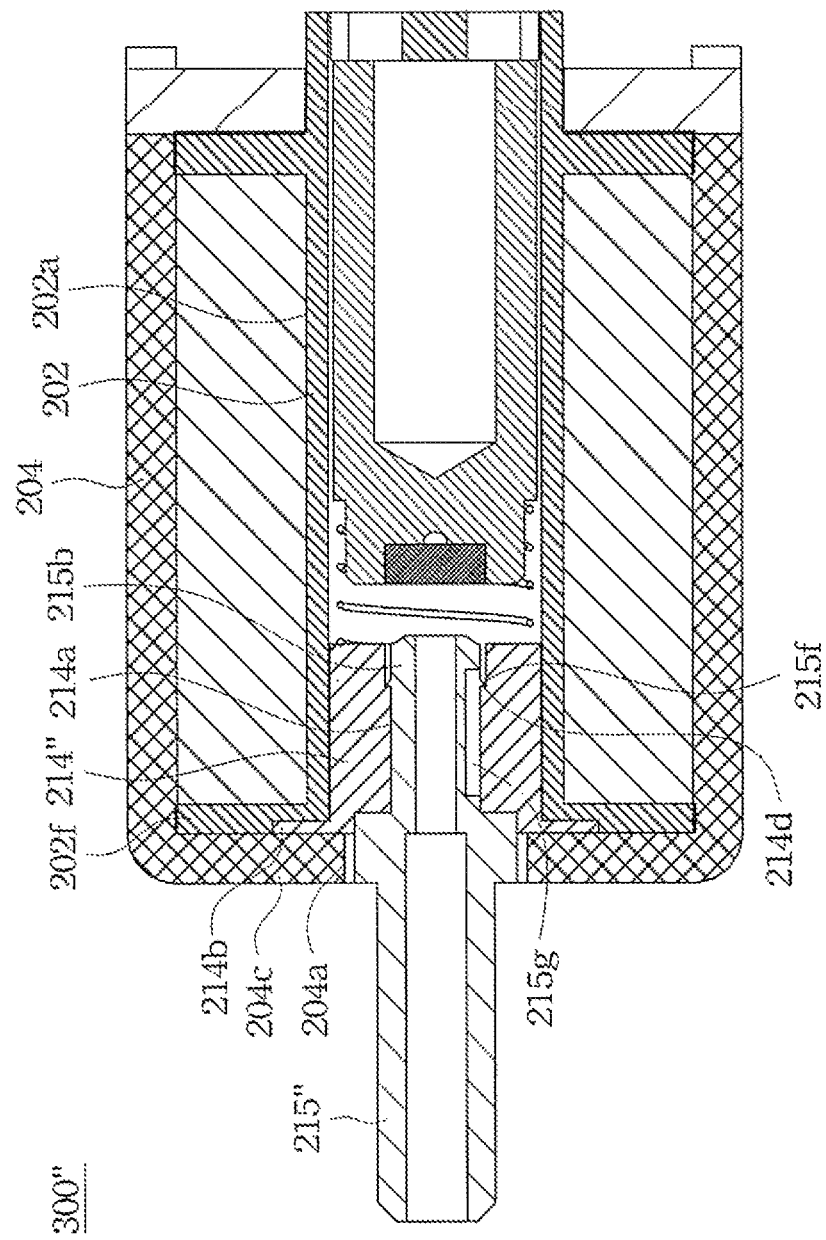
FIG. 7 illustrates a cross-sectional view of a pressure relief valve according to a fourth embodiment of this invention.

FIG. 7 illustrates a cross-sectional view of a pressure relief valve according to a fourth embodiment of this invention. The pressure relief valve 300" of FIG. 7 is different from the pressure relief valve 300 of FIG. 6 mainly in a securing mechanism between the plastic air faucet and the outer frame. In this embodiment, a plastic air faucet 215" is secured to a hollow channel 214a of a ferromagnetic cylinder 214". The ferromagnetic cylinder 214" is equipped with a circular step 214d in an inner wall of the hollow channel 214a thereof, namely, the circular step 214d forms an inner diameter difference within the hollow channel 214a. The plastic air faucet 215" has a circular outer hook 215f at the end 215b thereof. When the end 215b of the plastic air faucet 215' passes through the hollow channel 214a of the ferromagnetic cylinder 214, the circular outer hook 215f engages the circular step 214d to secure the plastic air faucet 215" to the ferromagnetic cylinder 214". When the end 215b of the plastic air faucet 215" passes through the hollow channel 214a of the ferromagnetic cylinder 214', at least the circular outer hook 215f of the plastic air faucet 215" should be shrunk in its diameter. Multiple stripe cutouts 215g are designed around the end 215b of the plastic air faucet 215" such that the circular outer hook 215f of the plastic air faucet 215" becomes a resilient structure and can be shrunk in its diameter to easily passes through the hollow channel 214a of the ferromagnetic cylinder 214'. In addition, the ferromagnetic cylinder 214" has an outer position ring 214b, which is sandwiched between one of the two restriction portions 202f and a portion 204c of the outer frame 204 surrounding the through hole 204a such that the ferromagnetic cylinder 214" is secured within pressure relief valve 300'.

According to the above-discussed embodiments, the pressure relief valve disclosed herein provides a plastic air faucet, which has a lower manufacturing cost than a conventional air faucet of ferromagnetic cylinder has. In addition, the plastic air faucet is designed to have a cutout at the outer ring of the air faucet, which serves as a pressure relief channel when the plastic air faucet is assembled to the through hole of the outer frame. Therefore, the pressure relief valve 200' has two pressure relief openings at two opposite ends thereof to enhance pressure relief efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A pressure relief valve comprising:
   an outer frame having a through hole;
   a ferromagnetic cylinder having a hollow channel, wherein the ferromagnetic cylinder is disposed completely within the outer frame;
   a plastic air faucet having a first end extending through the through hole and protruding out of the outer frame and a second opposite end extending through the hollow channel, whereby an air opening of the second opposite end is exposed, wherein the plastic air faucet has an outer ring, and the outer ring has a cutout, a pressure relief channel is defined between the cutout of the outer ring and the through hole of the outer frame;
   an electrical coil module disposed within the outer frame and having a central passage allowing the ferromagnetic cylinder to be disposed inside; and
   a ferromagnetic stopper being slidable along the central passage of the electrical coil module, wherein the ferromagnetic stopper has a seal gasket at an end thereof to seal the air opening of the plastic air faucet;
   a spring disposed between the plastic air faucet and the ferromagnetic stopper to provide a resilient force against the ferromagnetic stopper,
   when the electrical coil module is electrified, the ferromagnetic stopper and the ferromagnetic cylinder attract each other against the resilient force of the spring so as to push the seal gasket against the air opening of the plastic air faucet,
   wherein the ferromagnetic cylinder has a circular step disposed on an inner wall of the hollow channel thereof, and the plastic air faucet has a circular outer hook disposed at the second opposite end thereof, when the second opposite end of the plastic air faucet extends through the hollow channel of the ferromagnetic cylinder, the circular step has a right-angled corner to stop the circular outer hook so as to prevent from the plastic air faucet being pulled out of the ferromagnetic cylinder,
   wherein the plastic air faucet has a plurality of stripe cutouts around an outer surface of the second opposite end thereof,
   wherein the coil frame has two restriction portions at two opposite ends thereof, which define a wire trough therebetween, and the ferromagnetic cylinder has an outer position ring, which is sandwiched between one of the two restriction portions and a portion of the outer frame surrounding the through hole.

2. The pressure relief valve of claim 1, wherein the spring is a compression spring.

3. The pressure relief valve of claim 1, wherein the outer frame is a metallic frame.

4. The pressure relief valve of claim 1, wherein the seal gasket is a gasket made from elastic materials.

5. The pressure relief valve of claim 1, wherein the seal gasket is embedded within an end portion of the ferromagnetic stopper.

6. The pressure relief valve of claim 1, wherein the electrical coil module comprises a coil frame and a coil wire, the coil wire is wrapped around the coil frame.

7. The pressure relief valve of claim 6, further comprising a pair of electrode terminals, which are electrically connected with two opposite ends of the coil wire.

8. The pressure relief valve of claim 6, further comprising a metal plate to secure the electrical coil module to the outer frame.

9. The pressure relief valve of claim 6, wherein the coil frame is a plastic frame.

10. The pressure relief valve of claim 1, wherein the plastic air faucet has a positioning rib to engage a positioning slot disposed at the through hole of the outer frame.

11. The pressure relief valve of claim 1, wherein the ferromagnetic cylinder has first and second outer position rings, and a portion of the outer frame surrounding the through hole is sandwiched between the first and second outer position rings.

* * * * *